US009614939B2

(12) United States Patent
Mogul

(10) Patent No.: US 9,614,939 B2
(45) Date of Patent: Apr. 4, 2017

(54) NETWORK TIMEOUTS USING INTENTIONALLY DELAYED TRANSMISSIONS

(71) Applicant: Google Inc., Mountain View, CA (US)

(72) Inventor: Jeffrey Clifford Mogul, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 14/293,438

(22) Filed: Jun. 2, 2014

(65) Prior Publication Data

US 2015/0326698 A1    Nov. 12, 2015

Related U.S. Application Data

(60) Provisional application No. 61/990,378, filed on May 8, 2014.

(51) Int. Cl.
*G06F 15/16* (2006.01)
*H04L 29/06* (2006.01)
*G06F 9/54* (2006.01)
*H04L 29/08* (2006.01)

(52) U.S. Cl.
CPC .............. *H04L 69/28* (2013.01); *G06F 9/547* (2013.01); *H04L 69/32* (2013.01)

(58) Field of Classification Search
USPC ................................ 709/217, 218, 223, 224
See application file for complete search history.

(56) References Cited

U.S. PATENT DOCUMENTS

| 6,714,633 B1* | 3/2004 | Lehtinen | H04Q 3/0054 |
| | | | 379/201.12 |
| 7,024,556 B1* | 4/2006 | Hadjinikitas | H04L 63/0815 |
| | | | 709/225 |
| 7,363,342 B1* | 4/2008 | Wang | H04L 67/02 |
| | | | 709/204 |

(Continued)

FOREIGN PATENT DOCUMENTS

WO          9111871 A2     8/1991

OTHER PUBLICATIONS

International Search Report and Written Opinion for Application No. PCT/US2015/029645 dated Aug. 31, 2015.
Lee, K. S. et al. SoNIC: Precise Realtime Software Access and Control of Wired Networks. Proceedings of the 10th USENIX Conference on Networked Systems Design and Implementation (NSDI '13). USENIX Association. Apr. 2013, 13 pages.

(Continued)

*Primary Examiner* — Liangche A Wang
(74) *Attorney, Agent, or Firm* — Lerner, David, Littenberg, Krumholz & Mentlik, LLP

(57) ABSTRACT

A system and method is provided for generating network timeouts by utilizing intentionally delayed message transmissions sent internal to a network controller. For example, according to this system and method a network controller transmits a data message externally over a network and the data message invokes a response network message. The network controller also transmits a timeout message corresponding to the data message; however, the timeout message is intentionally delayed for a predetermined duration of time prior to being internally transmitted. controller host device receives at least one of the response message and the timeout message and determines which is received first. If the timeout message is received, a request associated with the transmitted data message is treated as having timed out.

20 Claims, 5 Drawing Sheets

(56) References Cited

U.S. PATENT DOCUMENTS

| | | | | |
|---|---|---|---|---|
| 8,914,882 B2* | 12/2014 | McDougal | ........... | H04L 63/1408 370/352 |
| 2007/0198629 A1* | 8/2007 | Ganguly | ................. | H04L 12/66 709/203 |
| 2008/0189350 A1* | 8/2008 | Vasa | ................... | H04L 12/2602 709/201 |
| 2009/0276382 A1* | 11/2009 | Baum-Waidner | ...... | G06Q 10/10 706/12 |
| 2009/0287866 A1* | 11/2009 | Mejias | ................ | H04L 12/2816 710/110 |
| 2010/0325219 A1* | 12/2010 | Vasters | ................... | G06F 9/546 709/206 |
| 2013/0117809 A1* | 5/2013 | McDougal | ........... | H04L 63/1408 726/1 |
| 2015/0319188 A1* | 11/2015 | Viel | ................... | H04L 63/0209 726/22 |

OTHER PUBLICATIONS

Overview of Single Root I/O Virtualization (SR-IOV). Microsoft Developer Network. Retrieved from <http://msdn.microsoft.com/en-us/library/windows/hardware/hh440148(v=vs.85).aspx>. © 2014, 1 page.

Radhakrishnan, S. et al. SENIC: Scalable NIC for End-Host Rate Limiting. 11th USENIX Symposium on Networked Systems Design and Implementation (NSDI '14). USENIX Association. Apr. 2014, 14 pages.

Remote procedure call. Wikipedia, the Free Encyclopedia. Retrieved from <https://en.wikipedia.org/wiki/Remote_procedure_call>. Feb. 25, 2002. 5 pages.

Session layer. Wikipedia, the Free Encyclopedia. Retrieved from <https://en.wikipedia.org/wiki/Session_layer>. Oct. 30, 2002. 2 pages.

International Preliminary Report on Patentability for PCT Application No. PCT/US2015/029645, dated Nov. 17, 2016.

* cited by examiner

NETWORK TIMEOUTS USING INTENTIONALLY DELAYED TRANSMISSIONS

CROSS-REFERENCE TO RELATED APPLICATIONS

The present application claims the benefit of the filing date of U.S. Provisional Patent Application No. 61/990,378 filed May 8, 2014, the disclosure of which is hereby incorporated herein by reference.

BACKGROUND

In computer networking and telecommunications, computing devices send messages to one another and often must wait for a response before proceeding. To avoid waiting indefinitely the computing devices may include a timeout mechanism that when triggered alert the computing device to perform some action. For example, if no response is received during the duration of a timeout the computing device may resend a message or close a connection. The duration of the timeout is often based on the amount of time in which a response should be expected.

As computing devices and networking infrastructure have increased in speed they are able to process more messages at higher rates. As a result, the duration necessary for a timeout has decreased. This creates a challenge for implementing a network timeout mechanism that can efficiently, accurately and reliably set and handle timeouts having short durations of time.

Traditional timeout mechanisms are based on network timeouts implemented in software. One example is scheduling timeout requests in data structures that are checked each time a kernel clock interrupt occurs. The problem is that kernel clock interrupts are costly and may not occur often enough to reliably trigger timeouts with short time durations. Other timeout mechanisms utilize busy loops implemented in software. The busy loop can accommodate timeouts with shorter durations of time, however, it may tie up the CPU thread for the duration of the delay and is thus less computationally efficient.

SUMMARY

The present disclosure relates to setting fine-grained timeouts. For example, a network controller having a large set of transmit (TX) queues and receive (RX) queues can be individually assigned to user-mode processes (for example, using existing SR-IOV hardware). User-mode or kernel-mode software can efficiently poll the receive queues for incoming packets, and can directly enqueue packet buffers on either kind of queue at relatively low cost. The network controller can also efficiently transfer a packet from one of its own TX queues to one of its own RX queues, without wasting actual network bandwidth (e.g., "loopback" is supported). The network controller can delay the transmission of a packet that is currently at the head of the TX queue, for an interval that is specified in the TX packet descriptor. For example, the network controller may have an internal clock that can provide precision on the order of a microsecond or less, and therefore can dequeue two packets from a TX queue, and transmit the second at a delay no shorter than that specified in its packet descriptor. A thread on a first host can send a remote procedure call (RPC) message to a second remote host with a zero transmit delay, followed by a short timeout message to itself with a delay of, for example, 137 usec. If the first host receives the RPC response first, then the RPC is treated as successful. However, if the first host receives its own timeout message first, it can treat the RPC as having timed out.

One aspect of the disclosure provides a method, comprising transmitting, by one or more processors, a data message externally over a network, the data message invoking a response message, and transmitting, by the one or more processors, a timeout message internally, the timeout message corresponding to the data message and being intentionally delayed for a predetermined duration of time. The method further comprises receiving, by the one or more processors, at least one of the response message and the timeout message, and determining, by the one or more processors, which of the at least one response message or the timeout message is received first. If the timeout message is received first, the method further comprises identifying a request associated with the data message as having timed out.

Another aspect of the disclosure provides a system, comprising one or more processors and a memory coupled to the one or more processors. The memory includes instructions executable by the one or more processors to transmit a data message externally over a network, the data message invoking a response message, transmit a timeout message internally, the timeout message corresponding to the data message and being intentionally delayed for a predetermined duration of time, receive at least one of the response message and the timeout message, determine which of the at least one response message or the timeout message is received first, and identify a request associated with the data message as having timed out if the timeout message is received first.

Yet another aspect of the disclosure provides a non-transitory computer readable medium recorded with instructions that, when executed by one or more processors, cause the one or more processors to perform a method. Such method comprises transmitting a data message externally over a network, the data message invoking a response message, transmitting a timeout message internally, the timeout message corresponding to the data message and being intentionally delayed for a predetermined duration of time, receiving at least one of the response message and the timeout message, determining which of the at least one of the response message or the timeout message is received first, and identifying a request associated with the data message as having timed out if the timeout message is received first.

DETAILED DESCRIPTION

Figure 1:
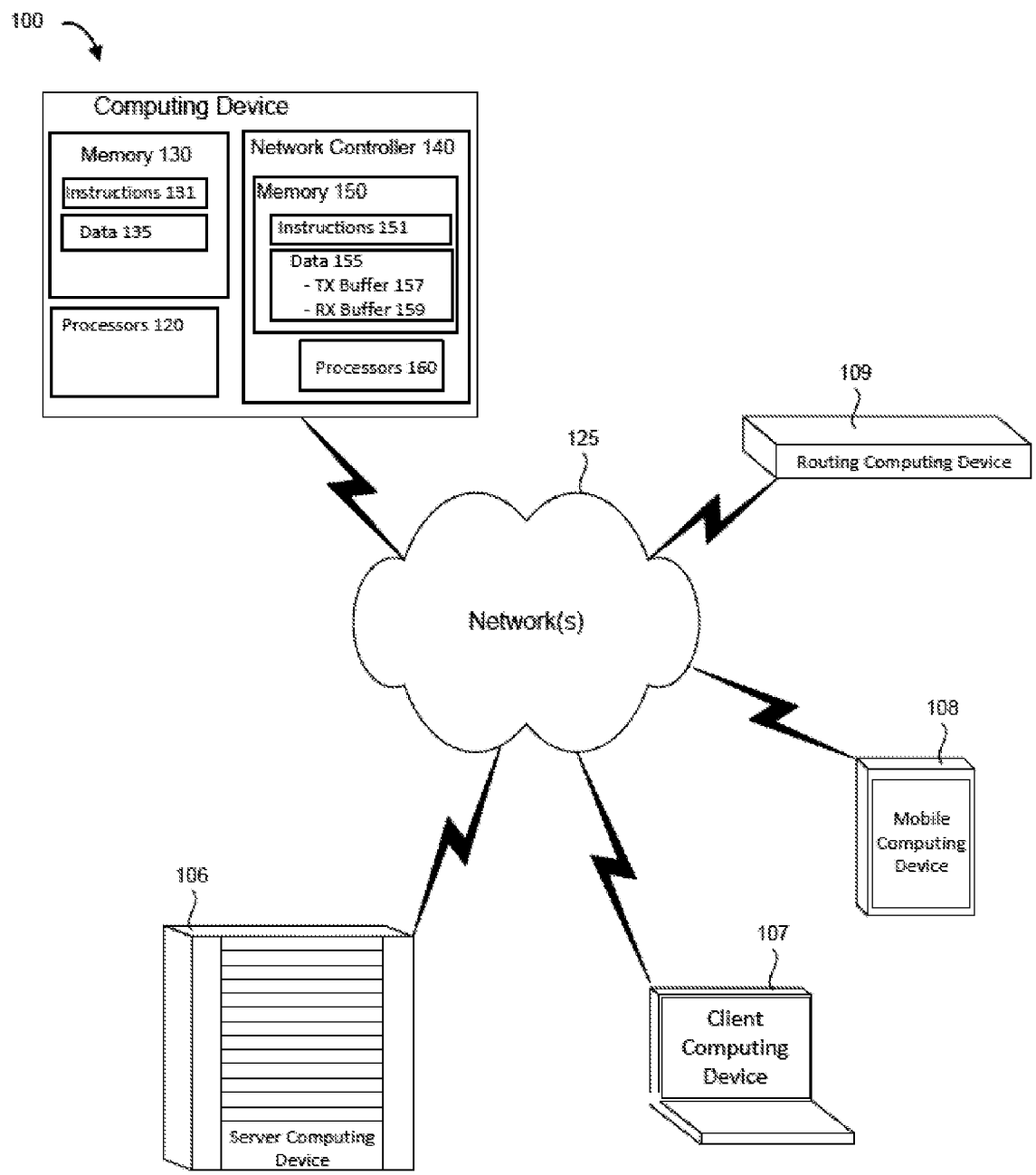
FIG. 1 is a schematic diagram of an example computer system according to aspects of the disclosure.

The technology generally relates to a timeout mechanism for network communications. The mechanism may trigger timeouts by utilizing intentionally delayed timeout message transmissions that are transmitted internal to a network interface controller (NIC). This may allow, for example, a computing device to utilize underlying networking hardware to monitor network traffic messages and generate timeouts when appropriate.

The timeout mechanism may include custom timeout packets that each correspond to one or more conventional data packets (e.g., RPC, HTTP). The timeout packets accompany the data packets on one or more transmission queues. Each timeout packet may be associated with a data field that allows the mechanism to intentionally delay transmission of the packet for a predetermined duration of time. In one example, the data field may store a time value associated with the duration of the delay. The data field may be contained within the timeout packet (e.g., header field or in body) or may be separate from the packet, for example in a separate data structure accessible to the mechanism (e.g., transfer packet descriptor). The time value may have sub-microsecond resolution and be an absolute time using a timebase generated by the mechanism or a relative time (e.g., relative to the time it was queued).

The duration of the delay may be customizable and may closely approximate the length of a network round-trip time or be slightly longer than the typical time for executing a remote interaction, such as RPC. When the delay lapses, the NIC sends the timeout packet to a host via its hardware loopback functionality. If the timeout packet arrives prior to a response to the corresponding data packet, a procedure, task, request, or the like associated with the data packet is treated as having timed out. For example, the host may cease waiting for a response to the data packet, and/or may resend a new data packet. On the other hand, if the response arrives before the arrival of the timeout packet, there is no timeout, and the NIC may abort the timeout packet before it is transmitted or simply ignore the timeout packet when it is received.

The NIC may determine whether it should abort the timeout packet in any of a number of ways. For example, one approach is to associate a second "doorbell" with each transmit queue. A doorbell is a small region of I/O address space, into which host software writes a value to inform the NIC that it has added N entries to the transmit queue. In one example, the second doorbell would allow the host software to instruct the NIC to remove the first N entries from the transmit queue, and discard them. This would allow the host to abort one or more timeout packets. According to another example, the second doorbell would allow the host software to instruct the NIC to remove the first N entries only if they carry a delay value, for example, with N=1. This would only delete a timeout packet, not a regular packet, from the transmit queue.

In one example the technology may include a network controller with a plurality of transmit queues and receive queues for handling networking packets (e.g., RPC, HTTP). Each queue may be individually assigned to kernel-mode or user-mode software that can efficiently poll the receive queues for incoming packets and may be able to directly enqueue packets on either kind of queue at relatively low computational and/or temporal cost. The NIC may be able to transfer a packet from one of its own transmit queues to one of its own receive queues, without using actual network bandwidth. The NIC may intentionally delay the transmission of a timeout packet that is currently at the head of the transmit queue, for an interval that is specified in a transfer packet descriptor (e.g., the delay field). The interval timing may utilize a clock internal to the NIC that is synchronized with a host clock and provides temporal precision on the order of a microsecond or less. When a timeout packet is received prior to a response of a corresponding data packet the NIC may trigger a system interrupt or set a flag to alert the kernel-mode or user-mode software that a timeout has occurred so that the host can react accordingly.

In another example, a thread on the computing device may want to send an RPC message to a remote computing device. The thread may select that the RPC message should timeout after a predetermined delay value, for example 137 microseconds. The thread may then send two packets, the first may be the actual RPC message in the form of a TCP/IP packet destined for the remote computing device with a zero transmission delay. The second packet may include a short network message that indicates "You've timed out," and may be formatted according to the User Datagram Protocol (UDP) with a transmit delay of 137 microseconds.

FIG. 1 illustrates one possible system 100, in which the aspects disclosed herein may be implemented. System 100 may be a computing device containing one or more processors 120, memory 130 and other components typically present in general purpose computing devices. Although FIG. 1 functionally represents processors 120 and memory 130 as single blocks within system 100, which is also represented as a single block, the system may include and the methods described herein may involve multiple processors, memories and devices that may or may not be stored within the same physical housing.

Memory 130 of system 100 may store information accessible by processors 120, including instructions 131 that may be executed by the processors 120. Memory 130 may also include data 135 that may be retrieved, manipulated or stored by processors 120. Memory 130 and the other memories described herein may be any type of storage capable of storing information accessible by the relevant processor, such as a hard-disk drive, a solid state drive, a memory card, RAM, DVD, write-capable memory or read-only memory. In addition, the memory may include a distributed storage system where data, such as data 135, is stored on a plurality of different storage devices that may be physically located at the same or different geographic locations.

The instructions 131 may be any set of instructions to be executed by processors 120 or other computing device. The instructions may be stored in object code format for immediate processing by a processor, or in another computing device language including scripts or collections of independent source code modules, that are interpreted on demand or compiled in advance. Functions, methods and routines of the instructions are explained in more detail below. Processors 120 may be any conventional processor, such as a commercially available CPU. Alternatively, the processor may be a dedicated component such as an ASIC or other hardware-based processor.

Data 135 may be retrieved, stored or modified by computing device 100 in accordance with the instructions 131. The data may comprise any information sufficient to identify the relevant information, such as numbers, descriptive text, proprietary codes, pointers, references to data stored in other memories such as at other network locations, or information that is used by a function to calculate the relevant data.

The computing device 100 may be a server computing device 106, client computing device 107, mobile computing device 108 or a routing computing device 109. Each computing device may include one or more network controllers 140 that may be used for communicating with other computing devices over network 125. Network controller 140 may be a separate device coupled with computing device 100, such as a separate computing module with its own processors 160 and memory 150 as illustrated (e.g., PCIe card, USB device or daughter card). Alternatively, the network controller 140 may be integrated into the computing device and share resources with the computing device, such as processors 120 and memory 130.

The network controller 140 may include a combination of hardware and software (e.g., firmware) for providing physical access to a network communication channel. The network communication channel may be based on a wired or wireless connection. Each Network controller may include one or more processors 160, which may include an Application Specific Integrated Circuits (ASIC), Field Programmable Gate Array (FPGA), general processor or any other kind of processor. Processors 160 may be coupled to memory 130, which may be capable of storing computer readable instructions 151 and data 155. Data 155 may include a transmit buffer 157 and a receive buffer 159 for storing network data (e.g., network messages). In one example, network controller 140 may be a network interface controller (NIC) (e.g., Ethernet, Asynchronous Transfer Mode (ATM), Token Ring), Optical Adapter (e.g., Fiber Channel) or a wireless network adapter (e.g., WiFi, Bluetooth, LTE, GSM, CDMA or TDMA).

Figure 2:
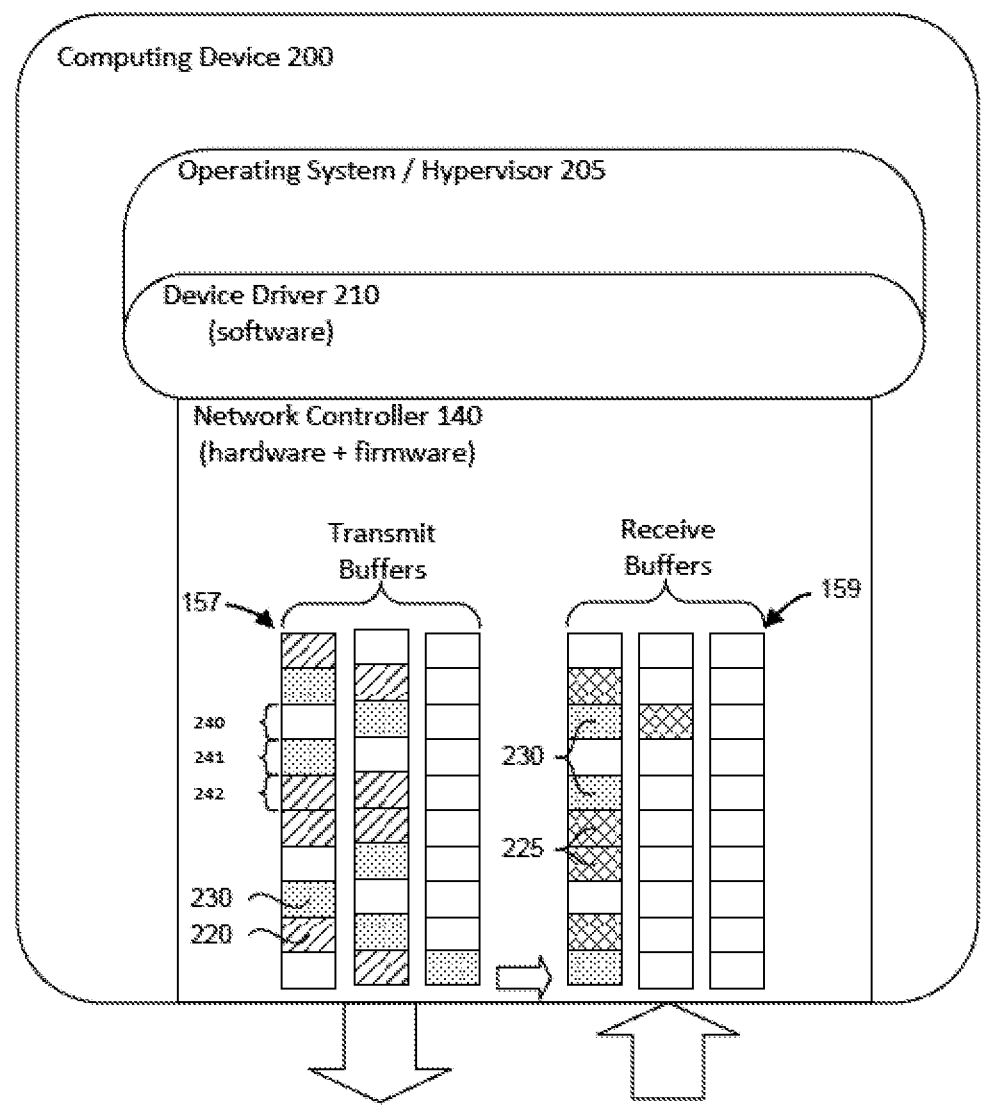
FIG. 2 is a diagram of an example system according to aspects of the disclosure.

As shown in FIG. 2, computing device 200 may include an operating system or hypervisor 205 with a device driver 210 for interacting with the hardware of network controller 140. Network controller 140 may include one or more transmit buffers 157 and one or more receive buffers 159. These buffers may be capable of storing a plurality of network messages, such as data network messages 220, response network messages 225 and timeout network messages 230.

Buffers 157 and 159 may be data structures, such as queues, circular queues, linked lists, arrays, heaps or other similar data structures that store network messages while keeping order and allowing for the addition and removal of entries. Each buffer (e.g., queue) may include a plurality of slots 240-242 each being capable of storing one or more network messages. In one example, a transmit buffer may include eight separate priority queues each queue having 1,000 or more slots to store network messages.

A network message (e.g., 220, 225, 230) may be any message capable of or configured to be sent over a network communication channel. The network messages may be, for example, a packet, frame, cell, data segment or datagram and may be ready to transmitted over the physical medium or may require additional preprocessing (e.g., still require destination MAC address). The network messages may be formatted to support a proprietary communication protocol or an industry standard protocol (e.g., IP, TCP, UDP).

Data network message 220 may be a type of network message and may include a request for data. The request for data when received by a remote computing device may invoke a response network message 225. Response network message 225 may be a type of network message that contains data corresponding to the request contained within the original data network message. In one example, a data network message 220 may be an internet protocol (IP) packet used as a form of inter-process communication between systems or processes (e.g., a Remote Procedural Call (RPC) packet). This may be used by a computing device to remotely interact with a remote computing device. The remote interaction may include providing instructions and/or parameters for execution on a remote computing device, such as remote method invocation (e.g., Java RMI, SOAP, ONC-RPC, XML-RPC). Once the instructions (e.g., data request) have executed, the resulting data may be included in one or more response network messages and sent back to the original computing device.

Timeout message 230 may also be a type of network message, and may be used to indicate that a requested procedure, task, or the like has time out. In some examples, the timeout message 230 may be used to schedule and trigger a network timeout. Each timeout message 230 may correspond to or be associated with one or more data network packets 220. Each timeout message 230 may be capable of or configured to be transmitted over network 125 yet may remain internal to computing device 200. For example, the computing device 200 may transmit this timeout message 230 to itself via a loopback functionality.

Each timeout message 230 may also be associated with a predetermined duration of time (e.g., delay value), which may be used by the computing device 200 to intentionally delay the transmission of timeout message 230. The delay value may be a quantity of clock cycles or a quantity of time on the order of seconds, milliseconds, microseconds, nanoseconds, or finer resolution. The delay value may be a relative value (e.g., 0.5 microseconds, or 50 nanoseconds) or it may be an absolute value (e.g., future time) based on an absolute starting point.

The delay value (e.g., predetermined duration of time) may be customizable and may closely approximate the length of a desired network timeout. In one example, the delay value may approximate the length of a network round-trip time. In another example, the delay value may be slightly larger than the typical duration of time it takes to execute a remote interaction, such as an RPC. This may take into account the round-trip time as well as the duration of time needed by the remote machine to execute, package, and transmit the resulting data. The delay value may also be determined dynamically in accordance with a communication protocol, for example the timeout period may be based on an RPC standard.

The delay value may be stored at any location accessible by the system (e.g., network controller). In one example, the delay value may be stored within timeout message 230, such as, in a data field within the header of the timeout network message 230 or within the body of the network message. Alternatively, the delay value may be stored in a data structure external to the network message that may correspond to or be associated with timeout network message 230. The external data structure may be associated with the timeout network message 230 while it is stored in either buffer (e.g., transmit buffer 157 or receive buffer 159) or it may be associated with the timeout network message 230 only while it is in the transmit buffer and may be removed after the timeout message is transmitted. In one example, the delay value may indicate a duration of time measured in microseconds or nanoseconds, and may be included in a message descriptor (e.g., external packet descriptor) that is associated with the timeout network message 230 while in the transmit queue.

Network controller 140 and device driver 210 may be configured to provide kernel-mode software and user-mode software access to buffers 157 and 159. This access includes the ability to poll the transmit and receive buffers for status, content or associated data (e.g., delay value) of message entries as well as the ability to add, remove or modify entries in the buffers (e.g., enqueue and dequeue). This may be done, for example, by having device driver 210 expose lower level functions (e.g., via an API) for directly manipulating the buffers. This may also include support for hypervisor pass-through or hypervisor by-pass if applicable. In one example, this may allow each buffer (e.g., queue) to be individually assigned and accessible to user-mode or kernel mode processes.

Figure 3A:
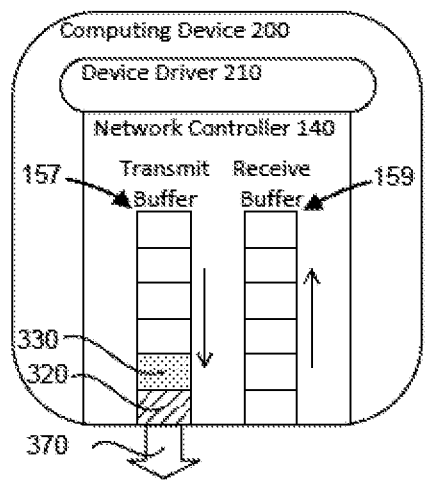
FIGS. 3A-D illustrate an example flow of network messages according to aspects of the disclosure.

FIGS. 3A-D illustrate an example flow of network messages between transmit buffer 157 and receive buffer 159 which may cause a network timeout to be generated. As shown in FIG. 3A, device driver 210 may instruct the network controller 140 to enqueue data network message 320 and corresponding timeout network message 330. As illustrated, there is a single data network message 320 at the head of the queue, followed by a single timeout network message 330. When a network message is at a head of the queue it may be ready to be processed and subsequently transmitted.

The transmission may be either external to the computing device or internal to the computing device (e.g., the NIC 140 may transmit the message to itself). In FIG. 3A, data message 320 is at the head of the queue. The data message 320 is transmitted externally over the physical network as indicated by arrow 370. For example, the message may be sent from a local computing device to a remote computing device. According to one example, the data network message may be encoded into an electrical signal and transmitted over a wired connection (e.g., Ethernet frame transmitted over an Ethernet cable).

Figure 3B:
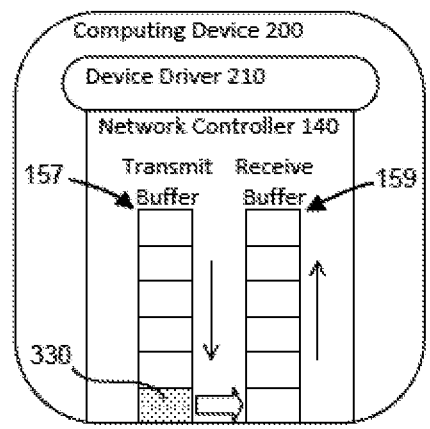

As shown in FIG. 3B, after the data message 320 is sent, it is removed from the transmit buffer 157 and timeout message 330 is moved to the head of buffer 157. The timeout message 330 is sent by the by the network controller 140 to the network controller 140 (e.g., sent internally). Timeout network message 330 is sent with an intentional delay, for example, the network controller 140 may wait or postpone transmission of the network message until a delay period has lapsed before transmitting the message.

The network controller 140 may determine the delay period has lapsed by comparing the delay value with a timestamp associated with the network message. The timestamp may have a resolution on the order of microseconds or smaller amounts of time, and may indicate the instant in time that the network message was added to the buffer (e.g., enqueued or re-queued). The timestamp may be read by the processor of the network controller and compared to the relative delay value to determine whether the intentional delay has elapsed. When the delay elapses the network controller may immediately transmit the message internally or it may flag it as available to be subsequently transmitted internally when the underlying hardware is capable.

Figure 3C:
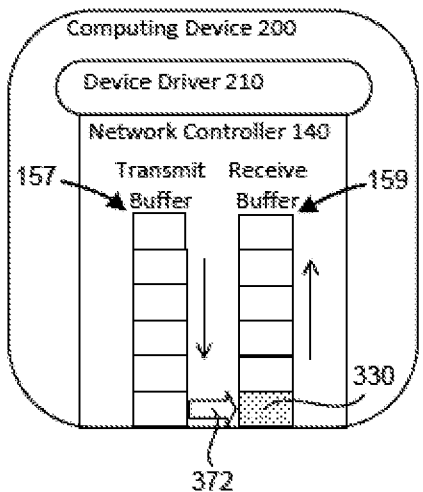

As shown in FIG. 3C, after the internal transmission delay, the timeout message 330 is received in receive buffer 159 of the network controller 140. Transmitting a message internally may include transmitting the message without going over the network, or without being transmitted external to computing device 200 and/or network controller 140. In one example, the network controller may be configured to have a hardware-only loopback path, as represented by arrow 372. The hardware-only loopback may include, for example, the network controller processor transferring timeout network message 330 from transmit buffer 157 to receive buffer 159, wherein both buffers are stored in memory 150 of network controller 140. If the buffers are queues, this may include dequeuing the network message from the transmit queue and enqueuing it into the receive queue without transmitting the message externally. The hardware-only loopback may be different from a traditional loopback because a traditional loopback is implemented in software only, such as the device driver or network stack of the Operating System, and is designed to bypass the network interface controller altogether.

Figure 3D:
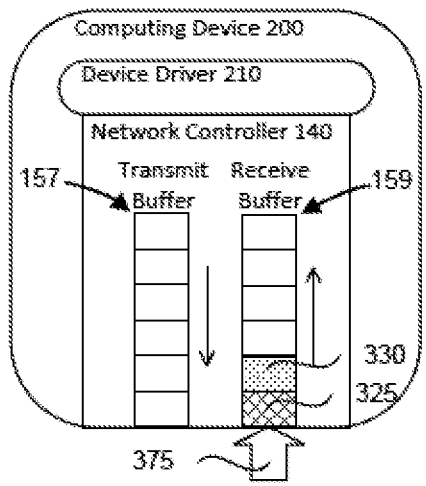

As shown in FIG. 3D, timeout network message 330 was received prior to response network message 325. In this case, the received timeout message 330 indicates that a request or task has timed out. For example, software of the computing device 200 may interpret the delayed packet as a timeout. As a result, the computing device 200 may decide to cancel or stop waiting for a response to the request or task.

In some examples, the network controller 140 may be designed to interpret receipt of the timeout network message 330 to generate or trigger a timeout. The timeout may signify that a predetermined period of time has elapsed without the occurrence of an expected event (e.g., receipt of a response). The timeout may be a timeout signal or timeout flag used to notify higher level software that a network timeout has occurred so that, for example, the higher-level software (e.g., operating system or hypervisor) may take action to address the issue (e.g., resend the network message). The timeout signal may include, for example, a hardware based interrupt that is detected by or interfaces with the device driver to notify the higher-level software that a timeout occurred. The timeout may also include setting a timeout flag (e.g., data structure member or field) that may be detected by higher-level software when polled. FIGS. 4A-D illustrate another example of network messages flowing between the transmit buffer 157 and receive buffer 159. In this example, based on the flow of messages, the network controller 140 does not deliver a delayed message to the computing device 200, and therefore the computing device 200 does not decide that a requested procedure has timed out. Also shown in this example, the NIC sends multiple data messages and one timeout message, wherein the one timeout message corresponds to each of the multiple data messages.

Figure 4A:
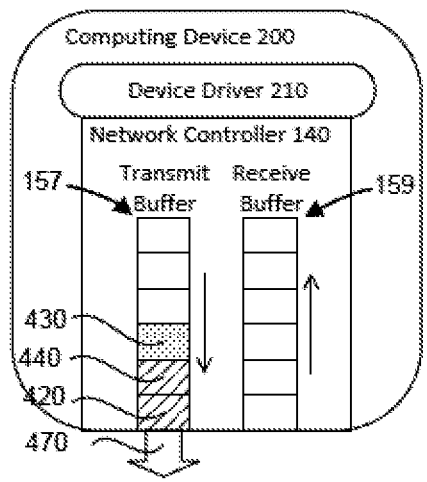
FIGS. 4A-D illustrate another example flow of network messages according to aspects of the disclosure.

As shown in FIG. 4A, device driver 210 may instruct the network controller 140 to enqueue data messages 220 and 420, plus a timeout message 430. The timeout message corresponds to both data messages 420 and 440, and may be associated with an absolute delay value, such as 1 second. In this example, data network message 420 is at the head of transmit buffer 157, followed by data message 440 and timeout message 430 which corresponds to both data messages 420, 440. The data message 420 may be transmitted externally as shown by arrow 470 and discussed above with respect to FIG. 3A.

Figure 4B:
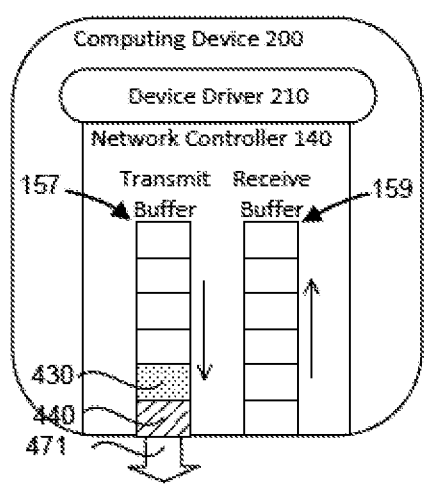
Figure 4C:
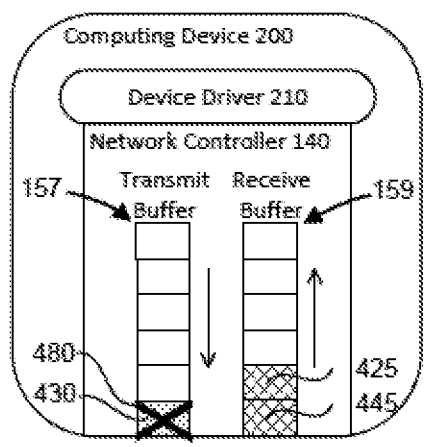

Moving to FIG. 4B, the data message 440 is similarly transmitted externally as shown by arrow 471. The timeout message 430 may be sent with the intentional delay, such as 1 second. For example, the timeout message will remain in the transmit buffer 157 until the intentional delay period has expired. As shown in FIG. 4C, response network messages 425 and 445 may be received in the receive buffer 159 prior to the expiration of the intentional delay, e.g., while the timeout network message 430 is still on transmit buffer 157. Being that the responses 425, 445 to both data messages 420, 440 associated with the timeout message 430 have already arrived, timeout message 430 may no longer be necessary. Accordingly, for example, the computing device 200 software, upon receipt of response 425, 445, recognizes that timeout message 430 is no longer necessary. As such, the software may ignore the timeout message 430 when it arrives. Alternatively, the software may abort the timeout message 430 prior to transmission, e.g., using a second doorbell. Aborting the timeout message 430 may be advantageous in that it avoids delaying a subsequent transmission while waiting for the timeout message 430 to be sent.

In some examples, the network controller 140 may be designed to recognize when the timeout message 430 is not necessary. For example, the network controller 140 may internally transmit the timeout message but may ignore it when it is received in the receive buffer 159. In another example, the network controller 140 may remove the timeout network message before it is sent, as represented by 480. This may allow the network controller to avoid wasting buffer space and computing power.

Figure 4D:
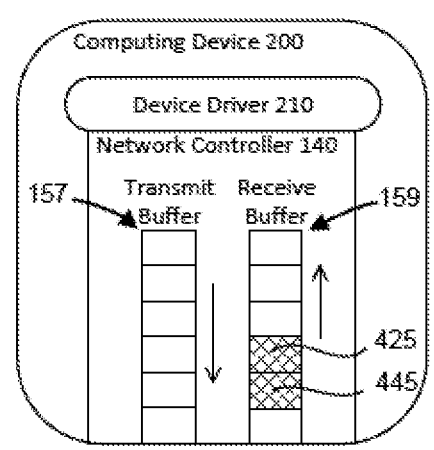

As shown in FIG. 4D, the timeout network message 430 has been removed from the transmit buffer 157. The removal may be implemented in a variety of ways, for example, network controller 140 may delete the message from the transmit buffer (e.g., dequeue) or overwrite it with another message in the buffer. In another example, it may leave the message in the buffer but may modify the message descriptor (e.g., packet descriptor) so that timeout network message 430 is transmitted to a null destination.

While the example above describes a timeout message associated with only two data messages, any number of data messages may be sent with one timeout message. For example, one timeout message can be used to set a fine grained timeout for 100, 1000, or more data messages.

In addition to the operations illustrated in FIGS. 2-4, various operations in accordance with a variety of aspects of the invention will now be described. It should be understood that the following operations do not have to be performed in the precise order described below. Rather, various steps can be handled in reverse order or simultaneously.

Figure 5:
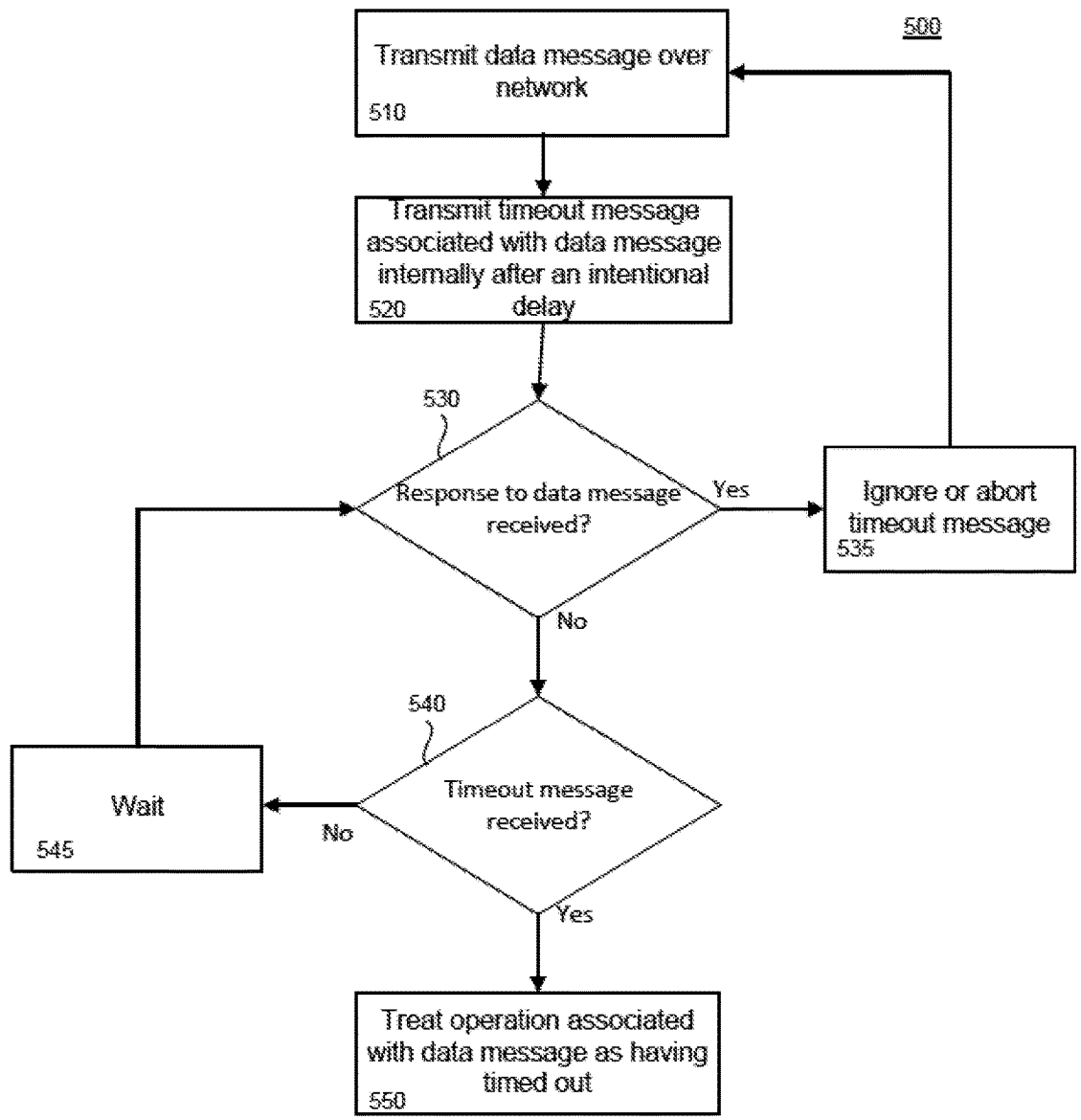
FIG. 5 is a block diagram of an example method of implementing network timeouts according to aspects of the disclosure.

FIG. 5 provides an example flow diagram illustrating a method 500. The method 500 may be executed, for example, by software of a host device, by the network controller 140, or by some combination thereof. The method 500 is described below with reference to the system of FIGS. 1-4. However, it should be understood that the method 500 may be implemented by any of a variety of systems having different configurations. It should also be understood that the operations involved in the above methods need not be performed in the precise order described. Rather, various operations may be handled in a different order or simultaneously, and operations may be added or omitted.

In block 510, the network controller 140 may transit one or more data network messages 220 externally over a network communication channel. For example, the computing device 200 may add the one or more data network messages 220 and one or more corresponding timeout network messages 230 to a transmit buffer 157. The transmit buffer may be stored in memory 150 of network controller 140, which, although accessible to operating system or hypervisor, may be modified only by processors 160 of network controller 140 and not by processors 120 of computing device 200. Alternatively, transmit buffer 157 may be stored in memory 130 (e.g., main memory) and accessible by processors 120 and 160. The transmission of the data message 220 may be over a wired or wireless connection external to network controller 140. The data network message 220 may include a request for data, which may induce a response network message.

In block 520, network controller 140 may transmit the timeout message 230 corresponding to the one or more data messages 220 internally after an intentional delay. For example, the network controller 140 may transmit the timeout message 230 to the computing device 200 via a loopback functionality. In some examples, network controller 140 may inspect the delay value associated with timeout message 230 and intentionally delay the transmission until the appropriate duration of time has elapsed. During the delay, the network controller may perform other functions, such as transmitting other network messages. Once the delay has elapsed, network controller 140 may transmit the timeout network message internally.

As shown in block 530, it is determined whether a response network message 225 has been received in response to the data message 220. For example, where the data message 220 is an RPC, it may be determine whether one or more responsive packets have been received. The responsive packets may be received in, for example, receive buffer 159 of the computing device 200.

If a response to the one or more data messages 220 is received, the corresponding timeout message 230 is ignored or aborted in block 535. For example, the network controller 140 may receive a second doorbell from the computing device 200 software indicating that the timeout message 230 should be removed from the transmit buffer 157. This may reduce the amount of data on the buffers as well as reduce the compute cycles associated with transmission and analysis. As another example, the computing device 200 may be programmed to ignore the corresponding timeout message 230 if it is received after all responses to the one or more data messages 220 are received.

If responses to the one or more data messages 220 are not received, in block 540 it is determined whether the corresponding timeout network message 230 was received internally after the lapse of the intentional delay. If the timeout message 230 has not yet been received, the computing device 200 may wait (block 545) and continue to look for responses to the transmitted one or more data messages 220.

In block 550, if it is determined that the timeout message 230 has been received, an operation associated with the one or more data messages 220 is treated as having timed out. For example, where the data message is an RPC, and the timeout message is received prior to a response to the RPC, the NIC treats the RPC as having timed out. In other examples, the timeout may be in the form of an alert or interrupt sent by the network controller 140 to device driver 210, which may be subsequently sent to the operating system or hypervisor 205.

The systems, methods and examples described above are advantageous in that they provide for setting fine-grained timeouts and handling the timeouts accurately and in a computationally efficient manner. As such, they accommodate latency-sensitive applications better than existing network timeout mechanisms. These systems and methods may also allow future and existing applications to function more quickly and reliably by detecting network timeouts faster and avoiding wasted time.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    transmitting, by one or more computing devices, one or more data messages externally over a network, the one or more data messages associated with a request and invoking a response message;
    transmitting, by the one or more computing devices, a timeout message internally from a transmit queue of the one or more computing devices, the timeout message corresponding to the one or more data messages and being intentionally delayed for a predetermined duration of time;
    receiving, by the one or more computing devices, at least one of the response message and the timeout message in a receive queue of the one or more computing devices;
    determining, by the one or more computing devices, which of the at least one response message or the timeout message is received first; and
    when the timeout message is received first, identifying, by the one or more computing devices, the request as having timed out.

2. The method of claim 1, wherein the one or more computing devices comprises a network controller, and further comprising:
    adding the data message and the timeout message to the transmit queue of the network controller; and
    wherein transmitting the timeout message internally comprises dequeuing the timeout message from the transmit queue and enqueuing the timeout message in the receive queue of the network controller.

3. The method of claim 2, further comprising:
    dequeuing the timeout message from the transmit queue when the response message is received prior to the transmission of the timeout message.

4. The method of claim 3, further comprising determining, with the one or more computing devices, whether to dequeue the timeout message from the transmit queue based at least on a received signal, the received signal instructing the one or more computing devices to remove a message from a head of the transmit queue.

5. The method of claim 1, wherein transmitting the timeout message internally comprises transmitting the timeout message to a host device using a loopback functionality of the network controller.

6. The method of claim 1, wherein the data message is one or more IP packets configured as a Remote Procedure Call and the predetermined duration of time for the intentional delay is longer than an estimated time to execute the Remote Procedure Call.

7. The method of claim 1, wherein the predetermined duration of time for the intentional delay is greater than an average network message round trip time.

8. A system, comprising:
    one or more processors; and
    a memory coupled to the one or more processors, the memory including instructions executable by the one or more processors to:
        transmit a data message externally over a network, the data message associated with a request and invoking a response message;
        transmit a timeout message internally from a transmit queue in the memory, the timeout message corresponding to the data message and being intentionally delayed for a predetermined duration of time prior to being internally transmitted;
        receive at least one of the response message and the timeout message in a receive queue in the memory;
        determine which of the at least one response message or the timeout message is received first; and
        identify the request as having timed out when the timeout message is received first.

9. The system of claim 8, further comprising a network controller, and wherein the one or more processors are further configured to:
    add the data message and the timeout message to the transmit queue of the network controller; and
    wherein transmitting the timeout message internally comprises dequeuing the timeout message from the transmit queue and enqueuing the timeout message in the receive queue of the network controller.

10. The system of claim 9, wherein the one or more processors are further configured to dequeue the timeout message from the transmit queue when the response message is received prior to the transmission of the timeout message.

11. The system of claim 10, wherein the one or more processors are further configured to determine whether to dequeue the timeout message from the transmit queue based at least on a received signal, the received signal instructing the one or more processors to remove a message from a head of the transmit queue.

12. The system of claim 8, wherein transmitting the timeout message internally comprises transmitting the timeout message to a computing device using a loopback functionality of the network controller.

13. The system of claim 8, wherein the data message is one or more IP packets configured as a Remote Procedure Call and the predetermined duration of time for the intentional delay is longer than an estimated time to execute the Remote Procedure Call.

14. The system of claim 8, wherein the predetermined duration of time for the intentional delay is greater than an average network message round trip time.

15. A non-transitory computer readable storage medium recorded with instructions that, when executed by one or more processors, cause the one or more processors to perform a method, comprising:
    transmitting a data message externally over a network, the data message associated with a request and invoking a response message;
    transmitting a timeout message internally from a transmit queue, the timeout message corresponding to the data message and being intentionally delayed for a predetermined duration of time prior to being internally transmitted;
    receiving at least one of the response message and the timeout message in a receive queue;
    determining which of the at least one of the response message or the timeout message is received first; and
    identifying the request as having timed out when the timeout message is received first.

16. The non-transitory computer readable storage medium of claim 15, further comprising a network controller, and wherein the method further comprises:
    adding the data message and the timeout message to the transmit queue of the network controller; and
    wherein transmitting the timeout message internally comprises dequeuing the timeout message from the transmit queue and enqueuing the timeout message into the receive queue of the network controller.

17. The non-transitory computer readable storage medium of claim 15, wherein the data message is one or more IP packets configured as a Remote Procedure Call and the predetermined duration of time for the intentional delay is longer than an estimated time to execute the Remote Procedure Call.

18. The non-transitory computer readable storage medium of claim 15, wherein the predetermined duration of time for the intentional delay is greater than an average network message round trip time.

19. The non-transitory computer readable storage medium of claim 16, further comprising transmitting a plurality of data messages, each of the plurality of data messages corresponding to the timeout message.

20. The non-transitory computer readable storage medium of claim 15, further comprising:
  dequeuing the timeout message from the transmit queue when the response message is received prior to the transmission of the timeout message.

* * * * *